(12) United States Patent  (10) Patent No.: US 8,376,268 B1
Otto  (45) Date of Patent: Feb. 19, 2013

(54) FLIGHT CONTROL SYSTEM USING THRUST DEVICES

(76) Inventor: Paul Robert Otto, Birmingham, AL (US)

( * ) Notice: Subject to any disclaimer, the term of this patent is extended or adjusted under 35 U.S.C. 154(b) by 0 days.

(21) Appl. No.: 13/442,439

(22) Filed: Apr. 9, 2012

(51) Int. Cl.
*B64B 1/36* (2006.01)
*B64C 15/00* (2006.01)

(52) U.S. Cl. ...... 244/52; 244/12.5; 244/23 B; 244/23 D; 244/56

(58) Field of Classification Search ........ 244/12.3–12.5, 244/23 B, 23 D, 51, 52, 56, 58
See application file for complete search history.

(56) References Cited

U.S. PATENT DOCUMENTS

| | | | |
|---|---|---|---|
| 4,436,261 A * | 3/1984 | Koleff | 244/51 |
| 4,660,767 A * | 4/1987 | Scrace | 239/265.35 |
| 5,769,317 A * | 6/1998 | Sokhey et al. | 239/1 |
| 6,648,270 B1 * | 11/2003 | Carter et al. | 244/23 A |
| 6,650,973 B2 | 11/2003 | Yamamoto | |
| 6,729,575 B2 * | 5/2004 | Bevilaqua | 244/12.3 |
| 7,584,924 B2 | 9/2009 | Ow | |
| 7,823,838 B1 * | 11/2010 | De ning et al. | 244/198 |
| 7,836,681 B2 | 11/2010 | Pesyna | |
| 7,967,255 B2 | 6/2011 | Head | |
| 8,074,925 B2 | 12/2011 | Morgan | |
| 8,087,616 B2 | 1/2012 | Shuster | |
| 8,094,066 B2 | 1/2012 | Mizuochi | |
| 8,095,249 B2 | 1/2012 | Little | |
| 8,099,201 B1 | 1/2012 | Barber | |
| 8,100,004 B2 | 1/2012 | Young | |
| 8,103,392 B2 | 1/2012 | Self | |
| 8,104,339 B2 | 1/2012 | Elgersma | |
| 8,108,085 B2 | 1/2012 | Builta | |
| 8,112,188 B2 | 2/2012 | Rouquette | |
| 8,113,468 B2 | 2/2012 | Patel | |
| 8,121,746 B2 | 2/2012 | Francois | |
| 8,121,783 B2 | 2/2012 | Bitar | |
| 8,126,600 B2 | 2/2012 | Conner | |
| 8,130,121 B2 | 3/2012 | Smith | |
| 8,135,501 B2 | 3/2012 | Boorman | |
| 2007/0018035 A1 * | 1/2007 | Saiz et al. | 244/12.3 |
| 2007/0095970 A1 * | 5/2007 | Richardson | 244/7 A |
| 2010/0301158 A1 * | 12/2010 | Harris et al. | 244/12.5 |

FOREIGN PATENT DOCUMENTS

| | | |
|---|---|---|
| CA | 801238 | 12/1968 |
| CA | 2256874 | 3/2009 |
| GB | 2312571 | 11/1999 |
| WO | WO2012035405 | 3/2012 |

* cited by examiner

*Primary Examiner* — Philip J Bonzell

(57) ABSTRACT

A flight control system use in relation to an aviation vehicle having a thrust vectoring device for producing thrust, an air deflecting device for producing thrust having a box structure, and a computing system for receiving operation requirements is used to orient the thrust device and/or air deflecting device.

5 Claims, 10 Drawing Sheets

_US 8,376,268 B1_

FLIGHT CONTROL SYSTEM USING THRUST DEVICES

BACKGROUND OF THE INVENTION

1. Field of the Invention

The present system and devices relate to an aviation vehicle utilizing thrust devices and a flight control system for controlling the aviation vehicle, and more particularly, to directional thrust devices operating with receiving air and diverting devices operate by diverting receiving air flow at an angle.

2. Description of the Related Art

The history of airplanes began with gliders and the first ones had pilots warp the wings to make flight corrections. After providing motors and propellers airplanes received cable connected flaps on the wings plus tail rudders to help control the airplanes. A noteworthy improvement was a means to actuate hydraulic control of the flaps. An engineered improvement was laminar flow wings that reduced drag 10%. Jet engines were a valuable development. Jet engine exhaust mechanisms now produce directional thrust (thrust vectoring) to help airplanes maneuver better.

The five elements mentioned made flying possible up to today. Replacing the wing structures with better devices is primary to improve flight. A wing structure has the drawback of constant wind drag on every foot of wing. Since the five elements can't evolve more, changing to a better technology may happen. Only improving electronic computer control to automate functions is being pursued to help make planes safer. Now stealth aviation vehicles need four computers to fly without crashing.

None of the earlier software or lifting devices (wings) adequately address flight control and directional thrust limitations. Software & mechanical engineering advances are needed to surpass the existing solutions the world relies on today. The projected flight control software & thrust devices are an attempt to overcome inadequacies of the present avionics technology. Improvements to address directional thrust problems will be available with the projected software and thrust devices.

BRIEF SUMMARY OF THE INVENTION

The flight control system (F.C.S.) will provide fundamental solutions to short-comings of existing software and structural designs (wings, tails and flaps). Elimination of drag is beneficial & allows flight without the engines operating. Gravity is a force no airplane is able to overcome without projecting wing structures out from the body. Thrust output from multiple device units will be powerful enough to give flight to a vehicle at lower speeds. The system will reduce instability and provide safer, slower take-offs and landings. The present devices will pass air through a round thrust nozzle at many times the speed of the vehicle or deflect the air without accelerating it. The computing system controls the orientation of the thrust vector device and the thrust deflecting device and provides comprehensive 3d position and terrain 'awareness' of all conditions will occur by processing digital input from the sensors, detectors, and radar-using navigation data files for reference. Actuation of the motorized devices is electronically linked to a computing system.

The F.C.S. will use local weather alerts in digital format from radio signals and radar to warn pilots about the weather ahead to allow planes to fly safer. The system will track local weather events and will not permit the vehicle to fly close to the problems. In addition, the F.C.S. system will permit flights to be miles above the weather disturbances in the upper Mesosphere.

The present disclosure will be better understood by studying the brief description of a number of embodiments taken by way of non-limiting examples and illustrated by the appended drawings, in which:

BRIEF DESCRIPTION OF THE DEVICE DRAWINGS

DETAILED DESCRIPTION OF THE DEVICE DRAWINGS AS PREFERRED EMBODIMENTS

The drawings show aspects of the present thrust device portion of the flight control system utilizing components. As the drawings are described, reference is to the present preferred embodiments. Terminology used herein to describe the present preferred embodiments is for the purpose of clarification. The invention, however, is not intended to be limited to specific terminology. Terminology used to describe each element should be understood to include all technical equivalents that operate in a corresponding manner to accomplish similar functions when in an aquatic environment, for example.

The present flight control system is related to aviation vehicles. The device components mentioned are considered to be used in practice. Characteristics and parameters pertain to structures of devices. The devices will be better understood by studying the detailed description of a number of embodiments taken by way of non-limiting examples and illustrated by the appended drawings.

The present disclosure permits flying without using fuel at hyper-sonic speeds above most of the atmosphere (in the upper Mesosphere). The aviation vehicle can stop using fuel after take-off is completed. The system will allow take-offs and landings at speeds near 50 mph for small, light aviation vehicles and is projected to be autonomous when the software is fully functional, so a "pilot" will not be needed for personal flying vehicles.

Figure 1:
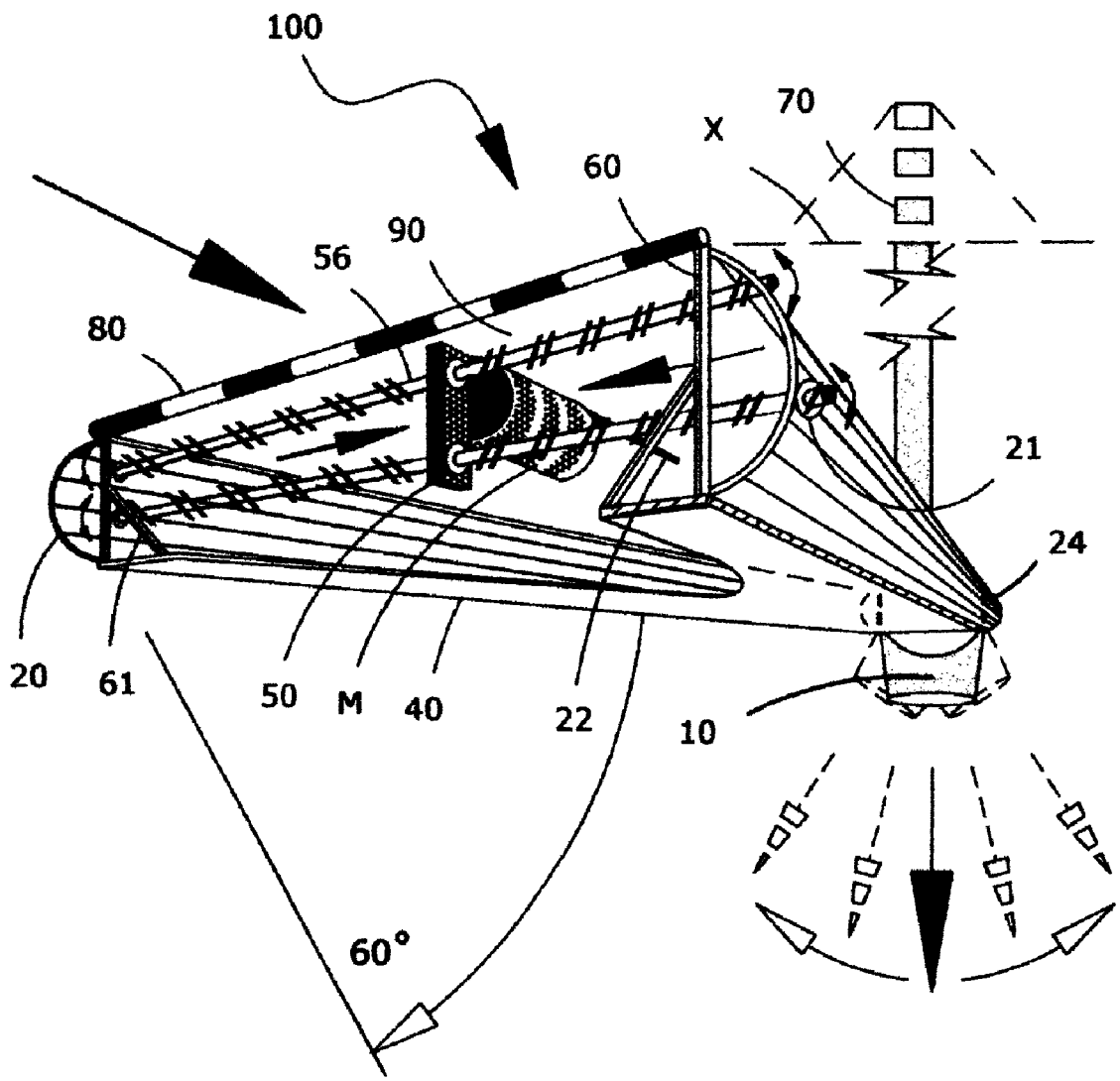
FIG. 1 is a perspective of a thrust vectoring device according to an exemplary embodiment of the present disclosure.

The present thrust vectoring device 100 to be used in relation to an aviation vehicle, for example, commercial aircraft, military aircraft, personal air vehicles (PAV), unmanned aerial vehicles (UAV), or the like. In one embodiment, as shown in FIG. 1, the thrust vectoring device 100 has a nozzle 10, pivoting half cylinder side 20, pivoting sphere with an inner-threaded aperture 21, centered main panel slot 22, rotation pin 24, outer triangular panel with cut-out 40, deployment device 50, threaded rod 56, support means 60, 62 for framing the thrust vectoring device 100, pivoting hydraulic cylinder 70, continuous hinge 80, and triangular main panel 90; according to an application of the thrust vectoring device 100 of the flight control system.

In one embodiment, the continuous hinge 80, rotationally engages mounting structure Y and support means 60, 62 thereby allowing for the thrust vectoring device 100 to rotate about the continuous hinge 80. The triangular main panel 90 of the thrust vectoring device 100 engages cylindrical fuselage X by way of the pivoting hydraulic cylinder 70.

In one embodiment, the thrust vectoring device 100 provides thrust thereby increasing the speed of the vehicle and/or operates as an air brake thereby reducing the speed of the vehicle. When the thrust vectoring device tilts, it acts as an air brake directing the air exiting the nozzle 10 in a forward direction up to 60 degrees from the fuselage. The pivoting hydraulic cylinder 70 extends using pressurized medium, for example, air or fluid, by actuating a pump thereby rotating the thrust vectoring device 100 away from the vehicle body about the continuous hinge 80 at an angle in relation to the vehicle body.

In one embodiment, upon the rotation of the thrust vectoring device 100 away from the vehicle body, the thrust vectoring device 100 increases the drag applied to the vehicle by deflecting and/or capturing passing air at an angle thereby reducing the speed of the vehicle.

In one embodiment, the triangular main panel 90, and a parallel outer triangular panel with a cut-out 40 engages the pivoting half cylinder sides 20, thereby forming a passageway for receiving air. Air enters the opening at the front of the passageway, flows through the passageway, and exits the nozzle 10 positioned at the rear of the trust vectoring device 100. The passageway can have the shape of a tube when the pivoting half cylinder sides 20 are in a first position or a funnel when the pivoting half cylinder sides 20 are in a second position.

In one embodiment, where the passageway is in the shape of a tube, each pivoting half cylinder side 20 serves as a portion of the periphery of the passageway. From a first position, the pivoting half cylinder sides 20 rotate away from the longitudinal axis of the thrust vectoring device 100, on rotation pins 24, positioned near the rear of the half cylinder sides 20. The rotation pins 24, allow for the front end of the half cylinder sides 20, to rotate away from away from the longitudinal axis of the thrust vectoring device 100. When the thrust vectoring device is tubular drag is reduced and the nozzle 10 provides lift and directional control.

In one embodiment, the pivoting half cylinder sides 20 transition from a first position to a second position upon actuating the deployment device 50. In one embodiment, the deployment device 50 actuates the rotating threaded rods 56 thereby providing for the pivoting spheres with an inner-threaded aperture 21 to traverse the rotating threaded rods 56. The pivoting spheres with inner-threaded orifices 21, traversing the revolving threaded rods, provide for the front ends of pivoting half cylinder sides 20 to be positioned away from the longitudinal axis of the hinged thrust vectoring device 100, thereby increasing the size of the opening allowing the passageway to capture more air. The increase in the size of the opening forces air to become pressurized and accelerates the air to many times the speed of flight. A thrust vectoring device 100 is more powerful the wider the opening is in comparison to the diameter of the nozzle 10. For example, a reasonable increase is four times the speed of flight when the opening of the passageway is four times the width of nozzle 10. 250 pounds of thrust becomes 1,000 pounds of thrust when the opening is actuated to its maximum size. The thrust vectoring device 100 has a "V" circled at the outlet arrow on FIG. 5A and a "4V" circled at the discharge arrow on FIG. 5B to show an air velocity difference from nozzle 10. By way of another example, the exiting air speed can increase eight times when the intake opening of the passageway is eight times the diameter of the nozzle 10.

In one embodiment, the thrust vectoring device 100 can have a diagonal brace 61 providing for lateral support to the trust vectoring device 100. The diagonal brace 61 can engage the support means 60 and the outer triangular panel with cut-out 40.

In one embodiment, the thrust vectoring device 100 can have a rod connector plate 25, positioned on end of the threaded rods 56 to reduce vibration of the threaded rods 56 when the deployment device 50, has retracted the pivoting half cylinder sides 20. The rod connector plate 25, is bent to match the surface of the half cylinder side 20, and has bearings positioned on the ends of the threaded rod 56.

In one embodiment, the thrust vectoring device 100 can have a curved transition panel 26, positioned to seal the rear edge of a pivoting half cylinder side 20 thereby preventing air from escaping the passageway between the half cylinder side 20 and segment 10C of the nozzle 10, as the half cylinder side 20 pivots through an arc between a first and second position. The curved transition panel 26 is secured to front segment 10C, of the nozzle 10.

Figure 2:
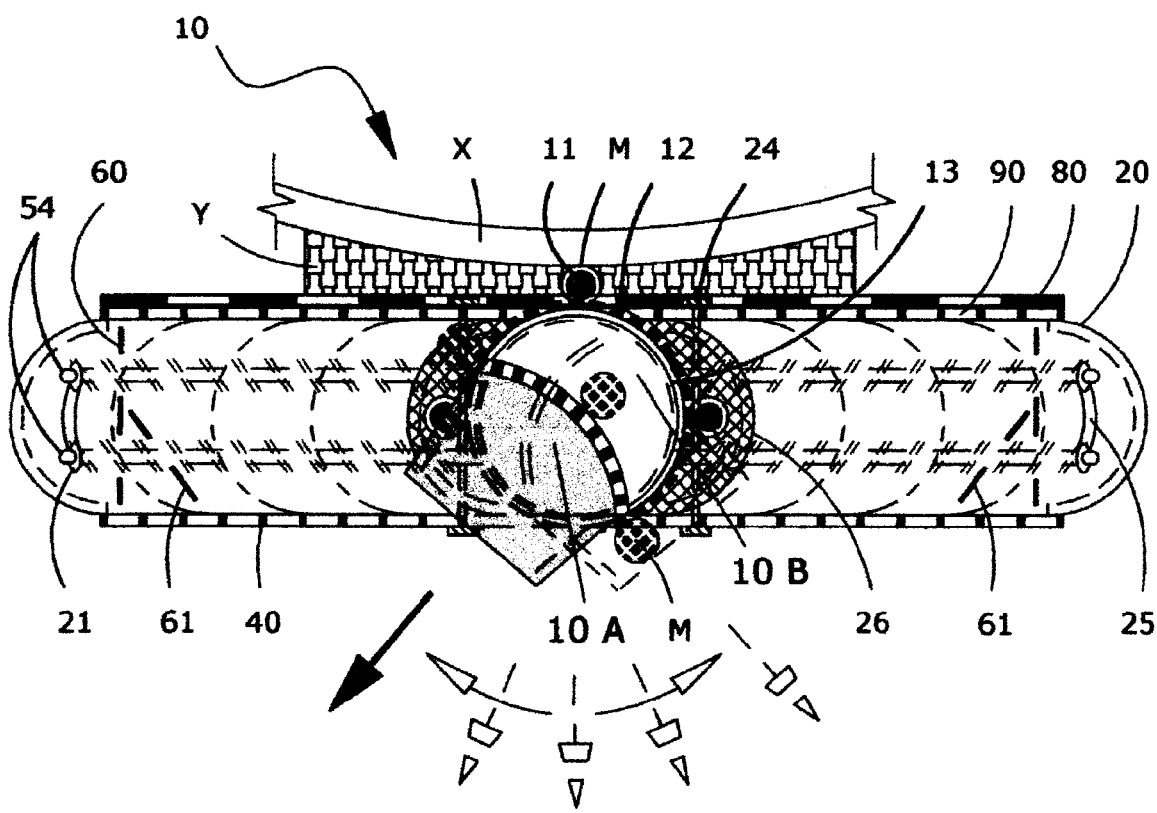
FIG. 2 is a side view of the thrust vectoring device according to an exemplary embodiment of the present disclosure.
Figure 3:
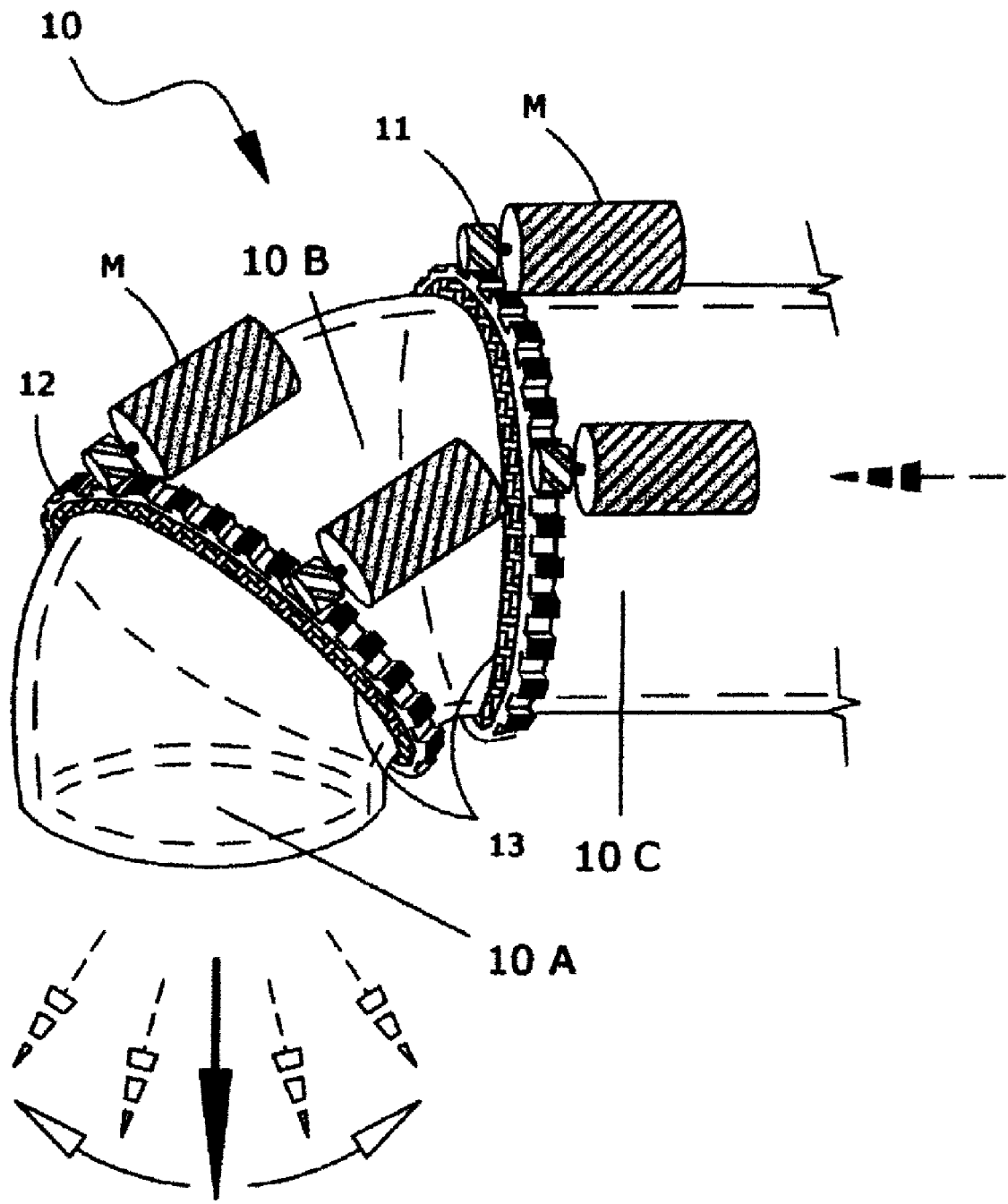
FIG. 3 is perspective of a nozzle according to an exemplary embodiment of the present disclosure.
Figure 4:
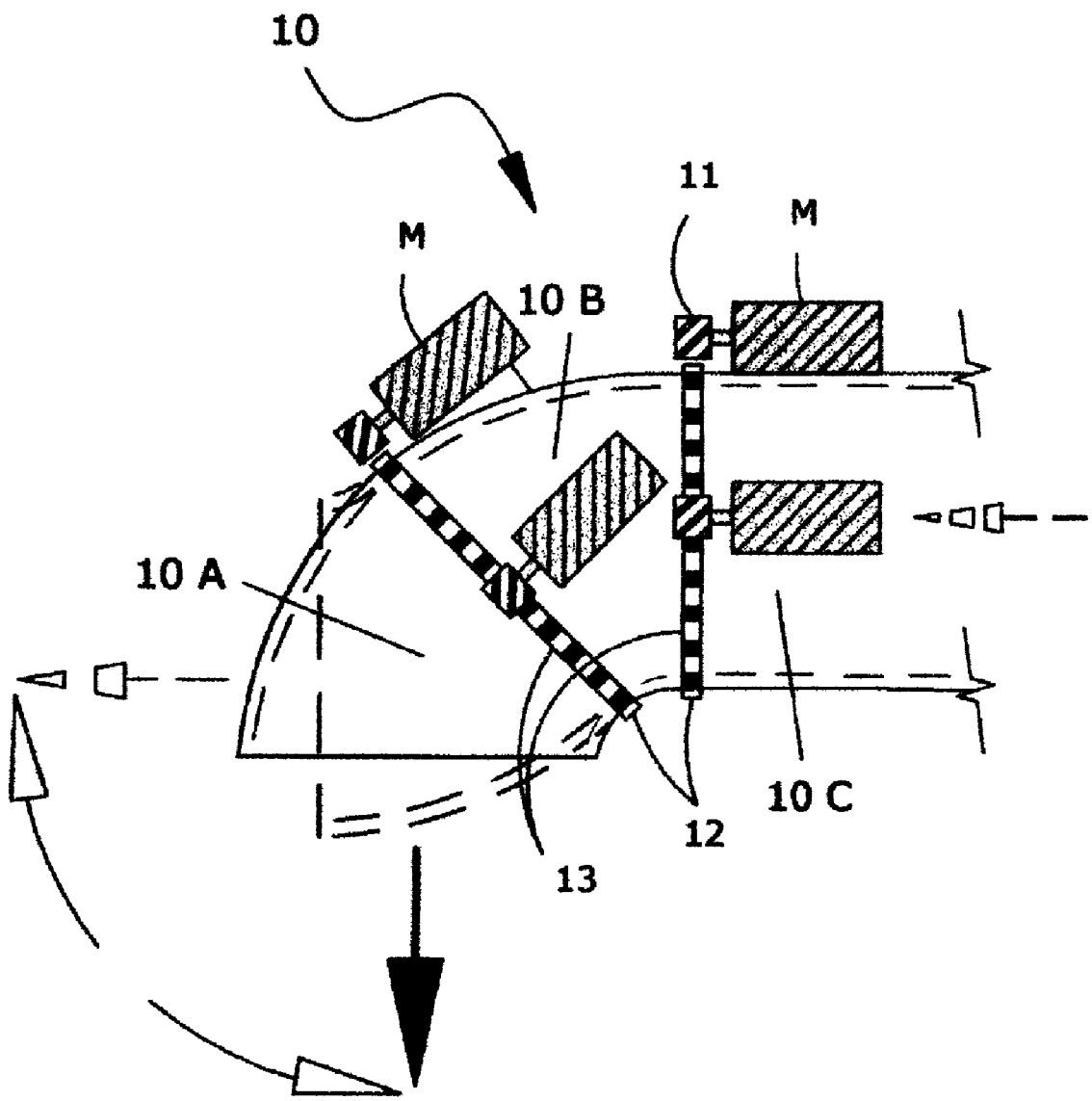
FIG. 4 is a side view of a nozzle according to an exemplary embodiment of the present disclosure.

The nozzle 10, as shown in FIGS. 2-4, has front segment 10C, elbow segment 10B, and outlet segment 10A, thereby allowing air to pass from the passageway, through the front segment 10C, through the elbow segment 10B, and exit the outlet segment 10A. Nozzle segment 10C is secured to triangular main panel 90, the outer triangular panel with a cut-out 40, and the transition panel 26.

In one embodiment, the nozzle 10 has motor M, motor shaft gear 11, gear ring 12, ring bearing 13, positioned on outlet segment 10A or elbow segment 10B. The gear ring 12 engages outlet segment 10A or elbow segment 10B by way of the ring bearing 13 and engages the power shaft gear 11, coupled to motor M shaft. Motor M rotates power shaft gear 11 which in turn rotates gear ring 12 which in turn rotates outlet segment 10A or elbow segment 10B of the nozzle 10. The electronic device communicates with the motor M thereby controlling orientation of the nozzle 10 and directing the air to flow to a desired direction.

Figure 6:
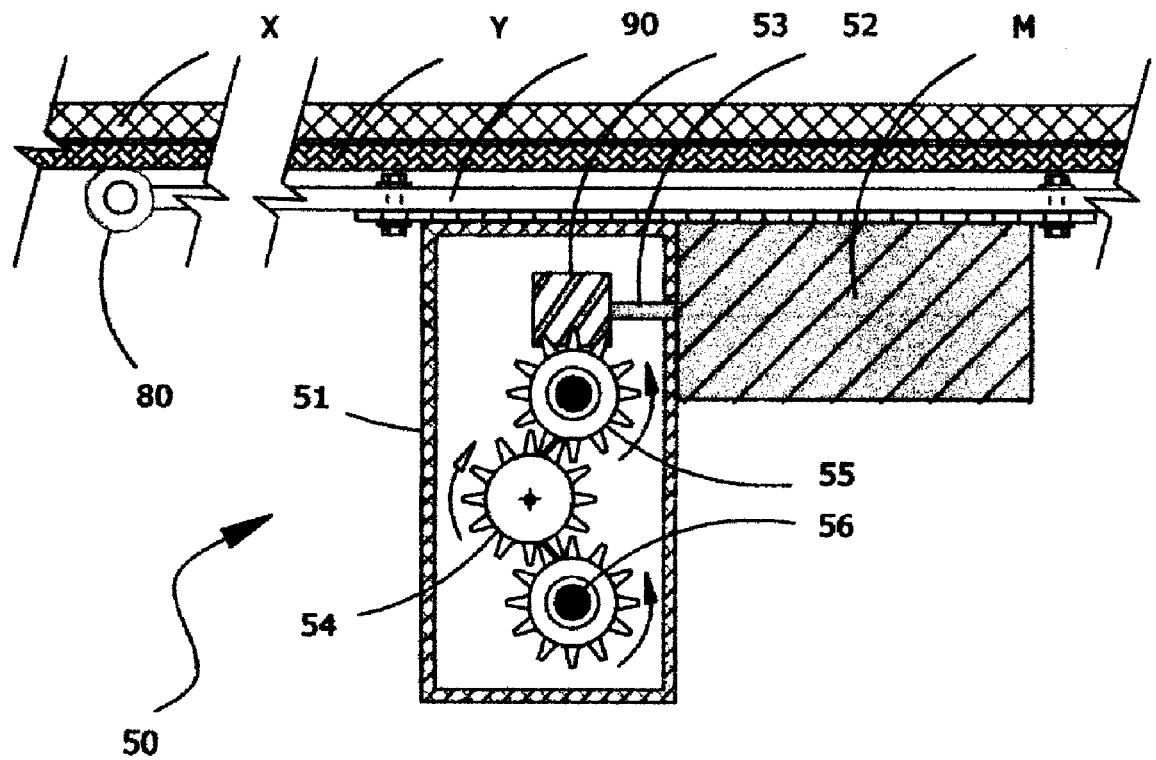
FIG. 6 is an operation view of a deployment device according to an exemplary embodiment of the present disclosure.

A section of a deployment device 50 of the thrust vectoring device 100, is shown in FIG. 6, to be used in relation to aviation vehicles. In one embodiment, the deployment device 50, positioned on a centered slot 22 of the triangular main panel 90, actuates to retract or to incrementally spread open the pivoting half cylinder sides 20 in the front as needed. Housing 51 of the deployment device 50 comprises components: power shaft 52, power shaft gear 53, center gear 54, and threaded rod rotator gears 55; according to an application of the thrust vectoring device 100 of the flight control system. The threaded rod rotator gear 55 engages the threaded rod 56 providing for the threaded rod 56 to rotate when the threaded rod rotator gear is rotated. The power shaft gear 53 engages threaded rod rotator gear 55. the motor M rotates the power shaft gear 53 by way of the power shaft 52 thereby providing for the rotation of the threaded rod rotator gear 55.

In one embodiment, the deployment device 50 of the thrust vectoring device 100, has at least one threaded rod gear 55 and a center gear 54. For example, the deployment device 50 can have two threaded rod rotator gears 55 to engage two threaded rods 56. The center gear 54 engages both threaded rod rotator gears 55 to rotate simultaneously. The threaded rod rotator gears 55 revolve the same direction (clockwise or counter-clockwise) when deployment device 50 is actuated by the motor M.

In one embodiment, the deployment device 50 of the thrust vectoring device 100 can traverse the centered slot 22 of the triangular main panel 90 to provide a means to relieve dynamic forces when the deployment device 50 is actuated. The deployment device 50 will traverse along the slot without assistance from a motorized mechanical device.

Figure 5A:
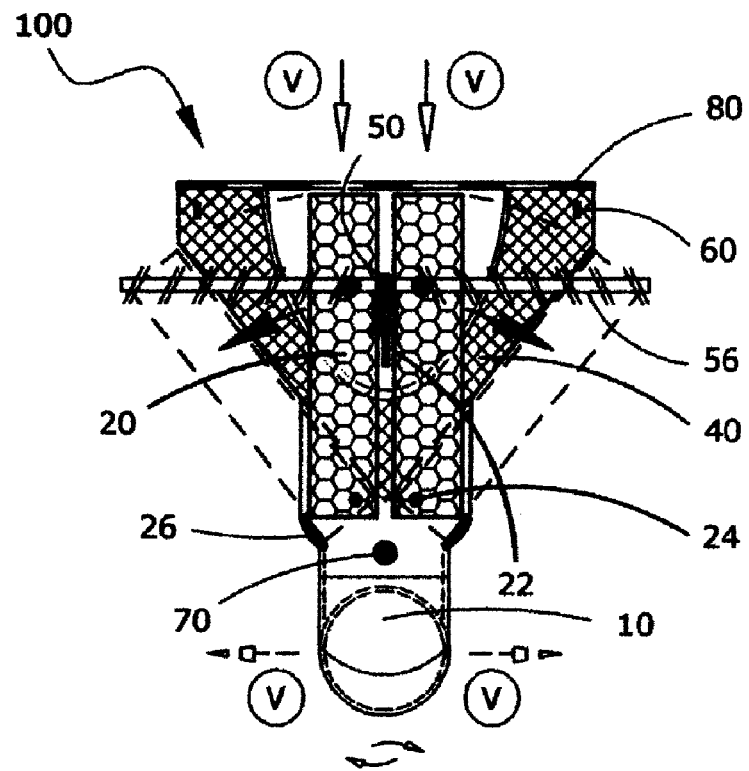
FIGS. 5A & 5B are operation views of said thrust vectoring device according to an exemplary embodiment of the present disclosure.
Figure 5B:
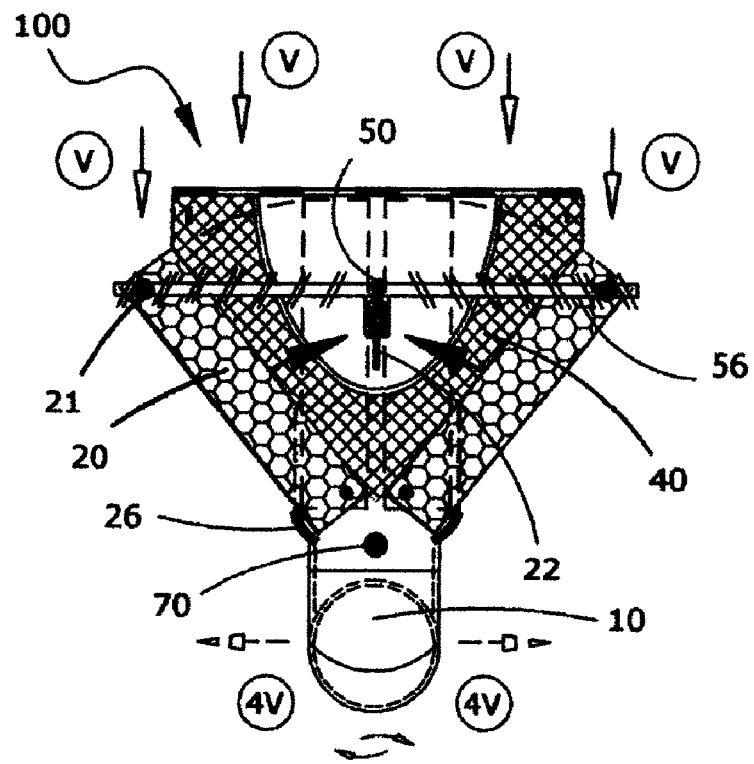

The thrust vectoring device 100, as shown with operational views in FIGS. 5A and 5B, are to be used in relation to aviation vehicles. In one embodiment, the thrust vectoring device 100 has a nozzle 10, pivoting half cylinder side 20, pivoting sphere with an inner-threaded aperture 21, main panel slot 22, rotation pin 24, transition panel 26, outer triangular panel with cut-out 40, deployment device 50, threaded rod 56, support means 60, pivoting hydraulic cylinder 70, continuous hinge 80; considered to be used in practice of the thrust vectoring device portion of the flight management system.

In one embodiment, the thrust vectoring device 100 configuration changes from having the pivoting half cylinder sides 20 retracted in FIG. 5A, then transitions to the second position where the half cylinder sides 20 pivot on rotation pins 24 to fully widen the passageway opening at the front in FIG. 5B.

In one embodiment, the thrust vectoring device 100 has a deployment device 50 positioned on a centered main panel slot 22, to actuate threaded rods 56 to modify the figure shown on FIG. 5A to totally deployed in FIG. 5B.

In one embodiment, the thrust vectoring device 100 on FIG. 5B shows the width of the passageway opening is four times the width of the nozzle 10. The thrust vectoring device 100 has a "V" circled at the outlet arrow on FIG. 5A and a "4V" at the discharge arrow on FIG. 5B to show an air velocity difference from nozzle 10. This exhibits a principle of the thrust vectoring device 100.

A section of a deployment device 50 of the thrust vectoring device 100, is shown on FIG. 6, to be used in relation to aviation vehicles. In one embodiment, the deployment device 50 is positioned on a centered slot 22 of the triangular main panel 90, actuates to retract or incrementally spread open the pivoting half cylinder sides 20 in the front as needed. Housing 51 of the deployment device 50 comprises components: power shaft 52, power shaft gear 53, and threaded rod rotator gear 55, according to an application of the thrust vectoring device 100 of the flight control system. The threaded rod rotator gear 55 engages threaded rod 56 providing for the threaded rod 56 to rotate when the threaded rod rotator gear is rotated. The power shaft gear 53 engages threaded rod rotator gear 55. The motor M rotates the power shaft gear 53 by way of the power shaft 52 thereby providing for the rotation of the threaded rod rotator gear 55.

In one embodiment, the deployment device 50 of the thrust vectoring device 100, has at least one threaded rod rotator gear 55 and a center gear 54. For example, the deployment device 50 of the thrust vectoring device 100 can have two threaded rod rotator gears 55 to engage two threaded rods 56. The center gear 54 engages both threaded rod rotator gears 55 providing for both rod rotator gears 55 to rotate simultaneously. The threaded rod rotator gears 55 revolve the same direction (clockwise or counter-clockwise) when the deployment device 50 is actuated by the motor M.

In one embodiment, the deployment device 50 of the thrust vectoring device 100 can traverse the centered slot 22 of the triangular main panel 90 to provide a means to relieve the dynamic forces when the deployment device 50 is actuated. The deployment device 50 will traverse along the slot without assistance from a motorized mechanical device.

Figure 7:
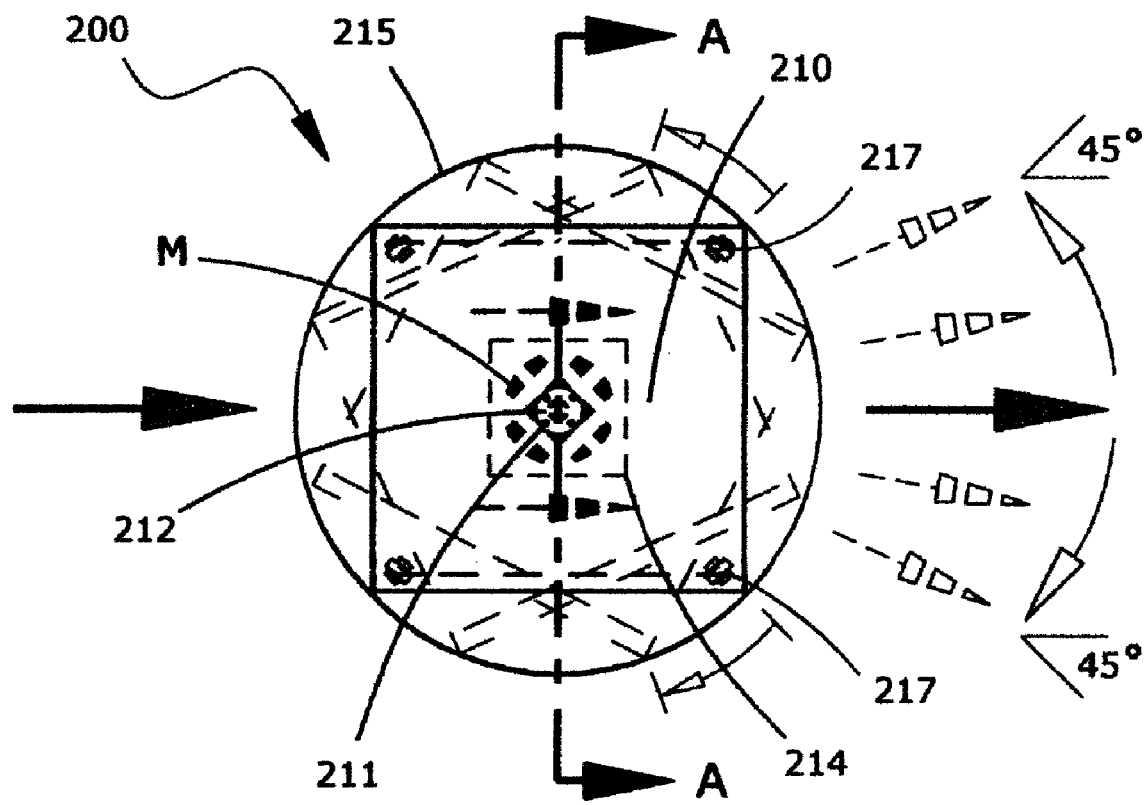
FIG. 7 is an operation view of an air deflecting device according to an exemplary embodiment of the present disclosure.
Figure 8A:
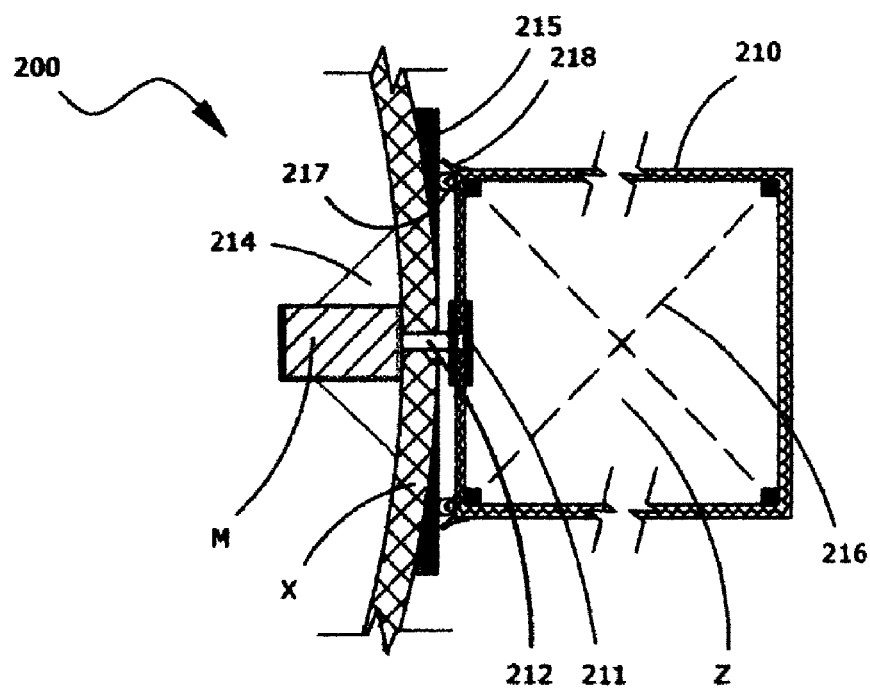
FIGS. 8A & 8B are cross-sectional views of a deflecting device according to an exemplary embodiment of the present disclosure.
Figure 8B:
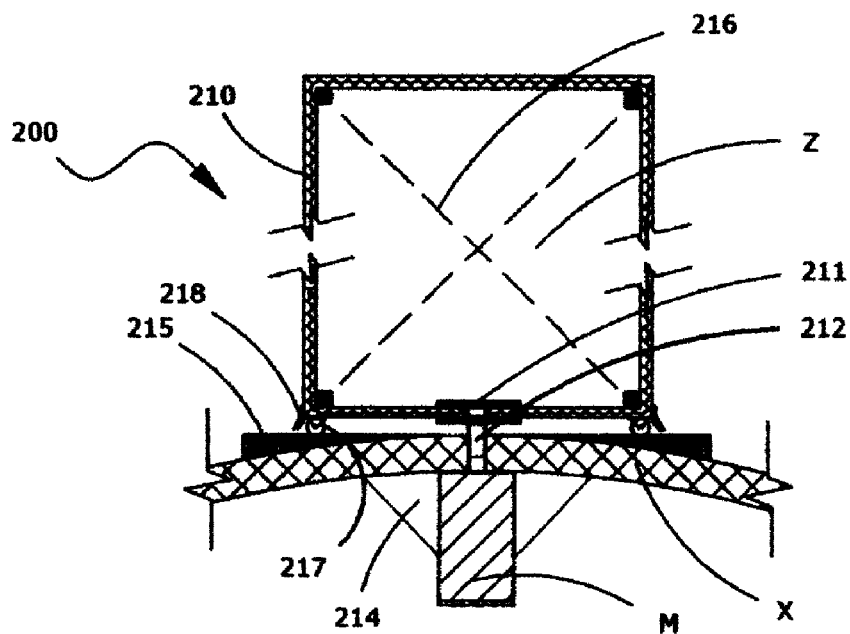

The present disclosure pertains to an air deflecting device 200 shown in FIG. 7, 8A, 8B to be used in relation to an aviation vehicle, for example, commercial aircraft, personal air vehicles (PAV), unmanned aerial vehicles (UAV), or the like. An air deflecting device 200 will be more effective than wing flaps and it slipstreams air when it is de-activated, resulting in little drag. Rotating two air deflecting devices 200 positioned on opposite sides of the aviation vehicle will produce balanced directional thrust. In one embodiment, the thrust vectoring device 100 and air deflecting device 200 can be used in relation to an aviation vehicle. In one embodiment, the air deflecting device 200 produces thrust by deflecting air received by the air deflecting device. The thrust provides for directional control of the aviation vehicle. The air deflecting device can be positioned at any location that allows for air to be deflected providing for directional control, for example, as shown on FIGS. 8A and 8B, the air deflecting device 200 can be positioned on the top/bottom or sides of the aviation vehicle.

In one embodiment, the air deflecting device 200 has open-ended box structure 210, box securing plate 211, motor shaft 212, motor M, motor mount 214, flat disc base 215, diagonal cross brace 216, support roller 217, and rubber seal 217. The motor M secured to motor mount 214 in the interior of cylindrical fuselage X. Open-ended box structure 210 of the air deflecting device 200 has an opening Z for receiving air through the open-ended box structure 210. The open-ended box structure 210 of the air deflecting device 200 is positioned on box securing plate at the end of motor shaft 212 exterior to fuselage X; according to an embodiment of the air deflecting device 200 of the flight control system.

Each open-ended box structure 210 of the air deflecting device 200 is rotated to a specific angle by the motor M, to deflect the receiving air. In one embodiment, the electronic device communicates with the computing system 300, thereby determining the angle of the open-ended box structure and the direction of the deflected air.

In one embodiment, the air deflecting device 200 has a support roller 217 to provide rotational support to the open-ended box structure 210. A support base 215 is secured to the cylindrical fuselage X for providing a flat surface for supporting support rollers 217. Support roller 217 engages the exterior of open-ended box structure 210 and rotationally engages support base 215.

In one embodiment, an air deflecting device 200 is positioned on cylindrical fuselage X, with a second air deflecting device 200 secured to the opposite side of the aviation vehicle. In one embodiment, the air deflecting device 200 operates in a coordinated manner with the second air deflecting device 200 to provide balanced thrust to push the aviation vehicle up, down or to the side. Pairs of air deflecting device 200 are positioned 180 degrees apart.

In one embodiment, the air deflecting device 200 can utilize diagonal cross-brace 216 across opening Z of the open-ended box structure 210 to provide structural support to the open-ended box structure 210. Dynamic forces that can distort the open-ended box structure are partially or wholly countered by cross-brace 216 where one end of cross-brace 216 engages the interior of one corner of the open-ended box structure 210 and the other end of the cross-brace 216 engages the interior of opposite corner of the open-ended box structure 210.

Figure 9A:
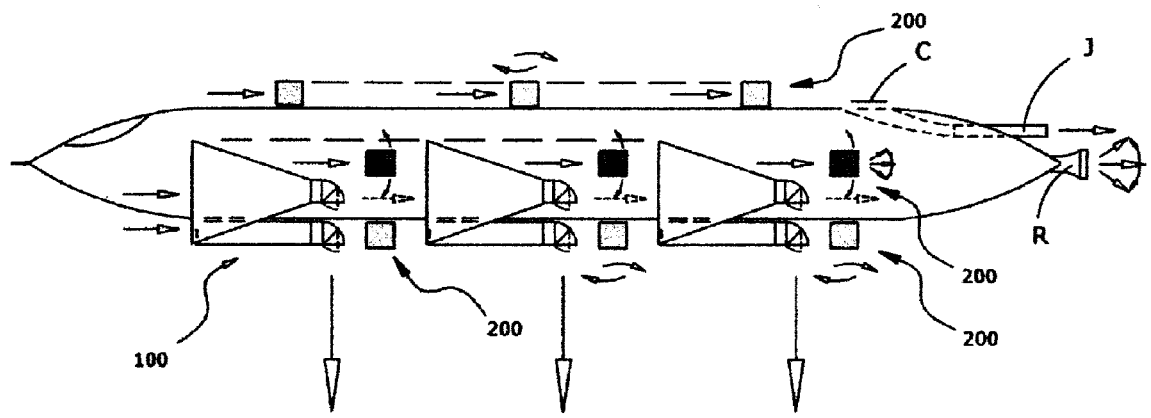
FIGS. 9A-9E are side views of an aviation vehicle, according to an exemplary embodiment of the present disclosure.
Figure 9B:
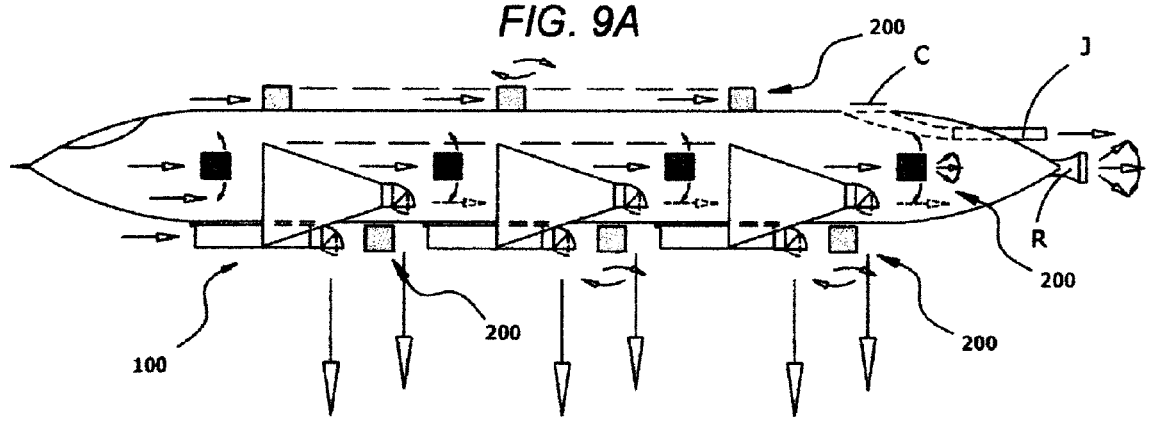
Figures 9C, 9D, 9E:
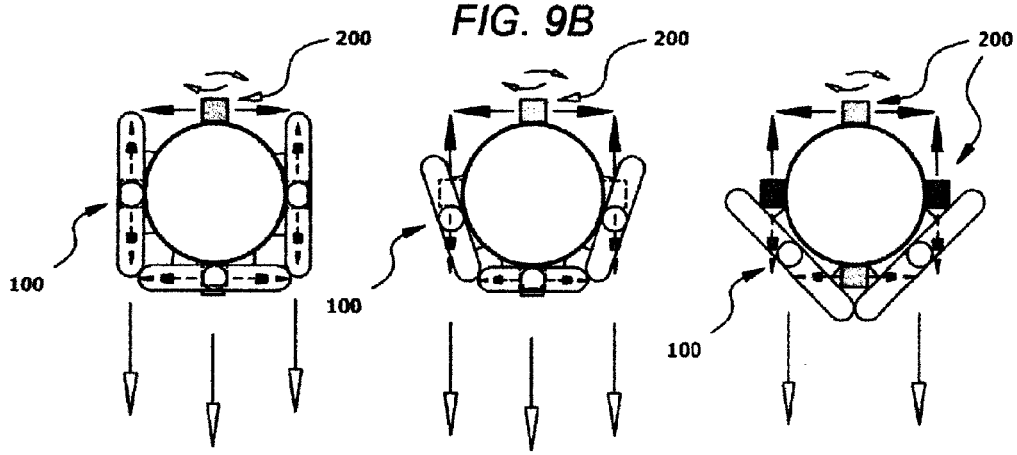

In one embodiment, as shown in FIGS. 9A-9E the aviation vehicle has thrust vectoring devices 100 and air deflecting devices 200. In one embodiment, the aviation vehicle has a plurality of thrust vectoring devices 100 positioned on the cylindrical fuselage X, as shown in FIG. 9A and 9B. In one embodiment, the aviation vehicle has a plurality of thrust vectoring devices 100 positioned on a cross-sectional plane of the cylindrical fuselage X, as shown in FIGS. 9C-9E. In one embodiment, as shown in FIG. 9A and 9B, the aviation vehicle has a plurality of air deflecting devices 200 positioned on the cylindrical fuselage X. In one embodiment, a plurality of air deflecting devices 200 is positioned on a cross-sectional plane of the cylindrical fuselage X, as shown in FIGS. 9C-9E. In one embodiment, the aviation vehicle has a plurality of air deflecting devices 200 positioned on the top and bottom of the cylindrical fuselage X. As shown in FIG. 9E, a pair of air deflecting devices 200 are positioned on the sides of cylindrical fuselage X of the aviation vehicle.

In one embodiment, the aviation vehicle can have an engine J, as shown in FIG. 9A and 9B. The engine J can be any type of aviation engine, for example, a duct jet, turbofan, turborocket (heated vapor and an oxidizer for Mach 5.8 speed), or the like. An air turborocket doesn't require inlet ducts or air management devices. The engine J can be positioned outside the aviation vehicle, or inside (utilizing an intake duct), at the rear of the cylindrical fuselage X. The intake duct can have distortion correction structures for engine J surge problems. A pivoting or slide-able round cover C (closes intake duct) is positioned over the receiving portal (opening) of the duct for the engine J. In one embodiment, the aviation vehicle can have a stationary or directional thrust rocket engine R that can be positioned on the rear end of the cylindrical fuselage X, as shown in FIG. 9A and 9B.

Figure 10:
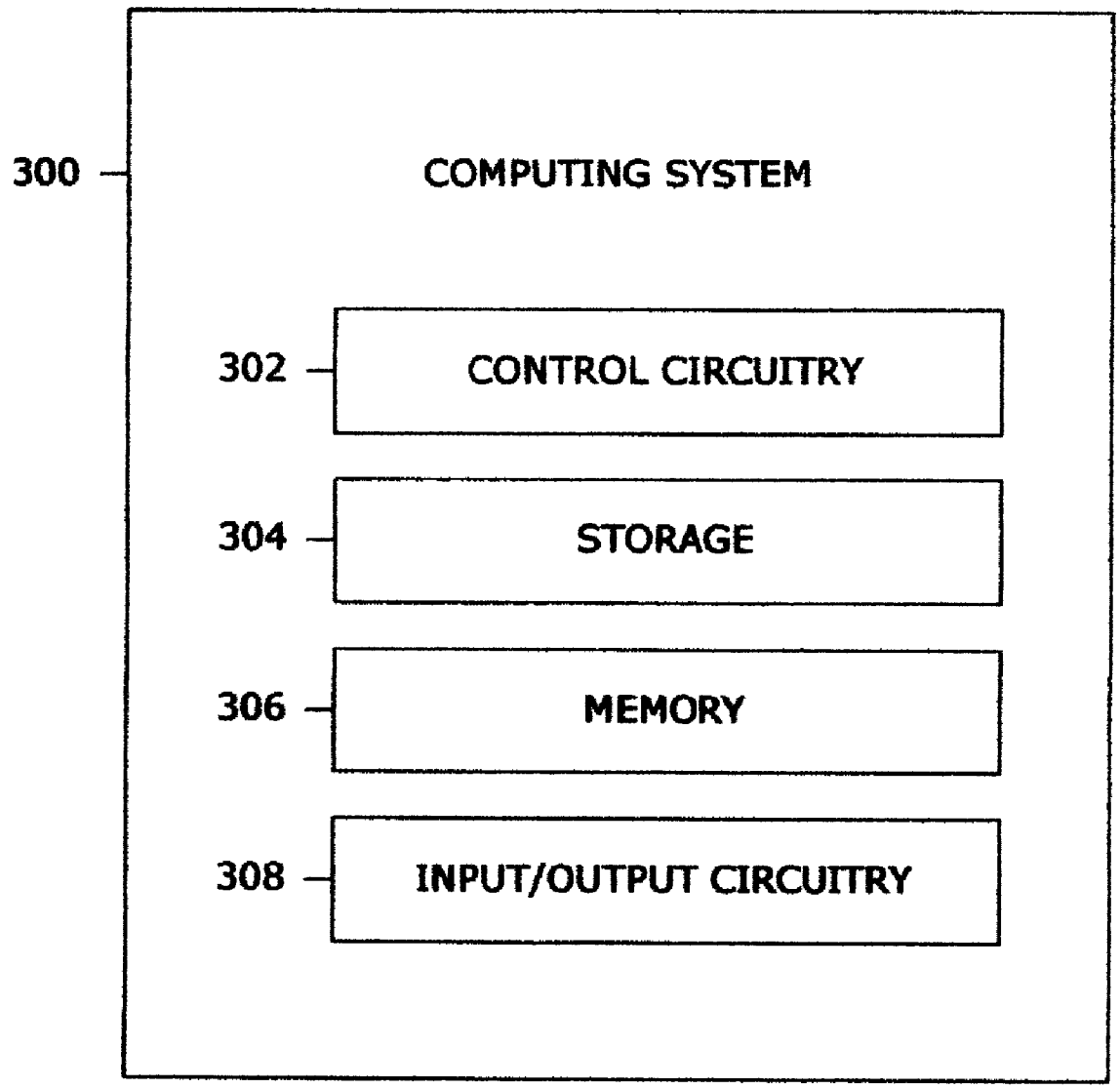
FIG. 10 is a schematic view of a computing system according to an exemplary embodiment of the present disclosure.

FIG. 10 shows an illustrative computing system 300 for providing an application for interfacing with a host. Computing system 300 can include control circuitry 302, storage 304, memory 306, and input/output ("I/O") circuitry 308. In some embodiments, one or more components of the computing system 300 can be combined or omitted (e.g. storage 304, memory 306 may be combined). In some embodiments, the computing system can include other components not combined or included in those shown on FIG. 10 (e.g. a display), or several instances of the components shown in FIG. 10. Only one of each of the components is shown in FIG. 10. The computing system 300 can include any suitable type of computing system 300.

Control circuitry 302 can include any processing circuitry or unit including a microprocessor, or processor operative to control the operations and performance of the computing system 300. For example, control circuitry 302 can be used to run the operating system applications, firmware applications, or any other application. In some embodiments, control circuitry 302 can drive a display and process inputs received from an interface.

Storage 304 can include, for example, one or more computer-readable mediums such as magnetic disc or tape, optical disk, or memory chip including a hard drive, solid state drive, flash memory, permanent memory such as ROM, any other suitable type of storage component, or any combination thereof. Storage 304 can store, for example, application data (e.g. for implementing functions on the computing system 300), firmware and any other suitable data or any combination thereof.

Memory 306 can include cache memory 306, semi-permanent memory such as RAM and/or one or more different types of memory 306 used for temporarily storing data. In some embodiments, memory 306 can also be used for storing data used to operate the computing system 300 applications, or any other type of data that can be stored in storage 304. In some embodiments, storage 304 and memory 306 can be combined as a single storage 304 medium. In some embodiments, storage 304 and memory 306 are coupled to the processing unit.

Applications comprising instructions for performing steps of the method described herein may be encoded in storage 304. When connected to computing system 300, these instructions may be read into a memory 306 of the computing system 300, enabling performance of the methods described herein.

I/O circuitry 308 can be operative (and encode/decode, if necessary) analog signals and other signals into digital data. In some embodiments, I/O circuitry 308 can also convert digital data into any other type of signal, and vice-versa. For example, I/O circuitry 308 can receive and convert physical contact inputs (e.g., from a multi-touch screen), physical movements (e.g., from a mouse or sensor), analog audio signals (e.g., from a microphone), or any other input. The digital data can be provided to and received from control circuitry 302, storage 304, memory 306, or any other component of computing system 300. Although I/O circuitry 308 is illustrated in FIG. 10 as a single component of computing system 300 several instances of I/O circuitry can be included in computing system 300.

Computing system 300 can include any suitable interface or component for allowing a respondent to provide inputs to I/O circuitry 308. For example, computing system 300 can include any suitable input mechanism, for example, a button, keypad, mouse, dial, a click wheel, or a touch screen. In some embodiments, computing system 300 can include a capacitive sensing mechanism, or a multi-touch capacitive sensing mechanism.

In some embodiments, computing system 300 can include specialized output circuitry associated with output devices such as, for example, one or more audio outputs. The audio output can include one or more speakers (e.g., mono or stereo speakers) built into computing system 300, or an audio component that is remotely coupled to computing system 300 (e.g., a headset, headphones or ear buds that can be coupled to communications device with a wire or wirelessly.

In some embodiments, I/O circuitry 308 can include display circuitry (e.g., a screen or projection system) for providing a display visible to the respondent. For example, the display circuitry can include a screen (e.g., an LCD screen) that is incorporated into computing system 300. As another example, the display circuitry can include a movable display or a projecting system for providing a display of content on a surface remote from computing system 300 (e.g., a video projector). In some embodiments, the display circuitry can include a coder/decoder (CODEC) to convert digital media data into analog signals. For example, the display circuitry (or other appropriate circuitry) within the computing system 300 can include video Codecs, audio Codecs, or any other suitable type of Codec.

The display circuitry also can include display driver circuitry, circuitry for driving display drivers, or both. The display circuitry can be operative to display content (e.g., application screens for applications implemented on the computing system 300, information regarding ongoing communications operations, information regarding incoming communications requests, or device operation screens) under the direction of control circuitry 302. Alternatively, the display circuitry can be operative to provide instructions to a remote display.

In one embodiment, the computing system 300 may include an application to interface with at least one server thereby providing the computing system with the ability to create and present transmissions to a server. For example, through the application of the computing system 300, the user can connect to a host server, website server, or the like. The host server can be any server that receives and transmits communication between the computing system 300 and the host. For example, the host server can receive communication from the host and transmit the communication to the computing system 300.

Communication between the computing system 300 and the host server, may be accomplished through any suitable network that may be provided by one or more communication interface, for example, WLAN, WAN, or LAN connection. Specifically, by way of example, the network may be a wireless internet connection established by way of the WLAN interface, a local area network connection established through the LAN interface, or a wide area network connection established by way of the WAN interface, which may include one of various WAN mobile communication protocols, such as a General Packet Radio Service (GPRS) connection, an EDGE connection (Enhanced Data rates for GSM Evolution connection), or a 3G connection such as in accordance with the IMT-2000 standard. One or more of the data encryption techniques and security protocols (e.g., SSL or TSL protocols) may be further utilized in order to facilitate the secure transmission of the data (e.g., session information) from the computing system 300 to the host server.

In one embodiment, the system has an application, or an Aviation vehicle Surveillance Applications System (ASAS), for pilots or autonomous flight, providing an air traffic control radar system with extended range, altitude and bearing tracker algorithms to provide tracking odds and reducing false tracks. The Aviation vehicle Surveillance Applications System (ASAS) can have an Airborne Surveillance/Separation Assurance Processor (ASSAP) and a high fidelity representation of the Cockpit Display of Traffic Information (CDTI) for pilots. The ASAS tracks targets that are potential collision threats and provides periodic track updates to the collision avoidance software. The ASAS can have high level functional architecture and low level algorithms for the ASSAP subsystem. The ASSAP algorithms have been implemented along with a high fidelity representation of the CDTI for pilots. Data from high resolution cameras is considered for F.C.S. (Flight Control System).

The computing system 300 can receive data, including but not limited to altitude, acceleration, airspeed, weather conditions, down winds, up winds, side winds, radar collision avoidance instructions, guidance parameters from navigation (GPS) and associated software. Data is produced by digital sensors, detectors, and radar, for example, gyroscopic devices, motion detectors, pressure sensors, data files from a navigation system, radar terrain evaluation, and special aerial collision avoidance software. Motion detectors & gyroscopic sensors will provide data to reduce dynamic wind problems.

Radar surveillance will transmit information about the terrain and position of the aviation vehicle to the computing system 300.

In one embodiment, the motor is coupled to a computing system 300 by signal connections providing for the desired position of the thrust device that corresponds to the required orientation or position of the aviation vehicle. The specific type of signal connections will vary depending on the application, but can include force signals, motor command signals, and position feedback signals. In one embodiment, the position is determined from a predetermined schedule which is stored in the storage 304 and can be based on factors including, without limitation, measured input force, aviation vehicle acceleration, airspeed and altitude.

After processing the received data, the computing system 300 transmits a signal to actuate the motor M thereby maintaining proper aviation vehicle operation. In one embodiment, the computing system 300 can receive and act on other control commands such as trim, autopilot, and stability augmentation systems, in place of independent motors and control surfaces. A signal is sent from the computing system 300 to the motor that corresponds to the orientation of the thrust device or the deflecting device required to position the aviation vehicle in a desired orientation or direction. The motor moves the individual component coupled thereto into the desired position and a signal is sent to the computing system 300 confirming the position of the individual component.

I claim:

1. A flight management system, use in relation to an aviation vehicle, comprising
    a thrust vectoring device for producing thrust, having a nozzle, a pivoting half cylinder side, a pivoting sphere with an inner-threaded aperture, a rotation pin, a passageway, a centered main panel slot, a deployment device, a threaded rod, an outer triangular panel with cut-out, a support means, a continuous hinge, a pivoting hydraulic cylinder, and a triangular main panel,
    an air deflecting device for producing thrust, having an open-ended box structure, a box securing plate, a motor shaft, a motor, a motor mount, a flat disc base, a support roller, and a rubber seal, and
    a computing system having storage storing machine-executable instructions configured for execution by the computing system in order to cause the computing system to receive operation requirements, the operation requirements used to orient the thrust device and/or the air deflecting device.

2. The system of claim 1 wherein the thrust vectoring device decreases the speed of the aviation vehicle.

3. The system of claim 1 wherein the air deflecting device further comprises a diagonal cross-brace.

4. The system of claim 1 wherein said pivoting half cylinder side rotates between a first position and a second position.

5. The system of claim 4 wherein the rotation of the pivoting half cylinder side is initiated by actuating the deployment device.

* * * * *